United States Patent
Hayman et al.

(10) Patent No.: US 6,932,195 B1
(45) Date of Patent: Aug. 23, 2005

(54) INTERMEDIATE SCAFFOLD MEMBER JOIN

(75) Inventors: Yates Westley Hayman, Walker, LA (US); Ken Hensley, St. Amant, LA (US); Robert E. Lea, Watson, LA (US)

(73) Assignee: Deltak Manufacturing, Inc., Walker, LA (US)

( * ) Notice: Subject to any disclaimer, the term of this patent is extended or adjusted under 35 U.S.C. 154(b) by 0 days.

(21) Appl. No.: 10/799,075

(22) Filed: Mar. 12, 2004

(51) Int. Cl.[7] .............................. E04G 7/00; E04G 1/00; F16D 1/00
(52) U.S. Cl. ............................... 182/178.1; 182/186.8; 403/187; 403/408.1; 403/49
(58) Field of Search ......................... 182/178.1, 178.5, 182/179.1, 186.8, 186.7; 403/49, 246, 187, 403/188, 353, 408.1; 248/316.5, 230.4, 230.1; 52/655.1, 638, 637, 651.1

(56) References Cited

U.S. PATENT DOCUMENTS

| | | | | |
|---|---|---|---|---|
| 2,195,906 A | * | 4/1940 | Uecker et al. ............. 52/651.1 |
| 2,392,932 A | * | 1/1946 | MacBeth ...................... 403/73 |
| 2,506,640 A | * | 5/1950 | Hawes ......................... 403/395 |
| 3,105,667 A | * | 10/1963 | Bauer ........................ 248/499 |
| 3,870,124 A | * | 3/1975 | Howard ................... 182/178.5 |
| 3,902,817 A | * | 9/1975 | Meir .......................... 403/188 |
| 4,632,221 A | * | 12/1986 | Stanford ................. 182/186.8 |
| 4,967,878 A | * | 11/1990 | Adams ..................... 182/186.8 |
| 5,040,916 A | * | 8/1991 | Morgan ...................... 403/387 |
| 6,786,302 B2 | * | 9/2004 | Liew et al. .............. 182/186.8 |
| 6,789,649 B2 | * | 9/2004 | Herrmann ................ 182/186.7 |

* cited by examiner

Primary Examiner—Hugh B. Thompson, II
(74) Attorney, Agent, or Firm—Jones, Walker, Waechter, Poitevent, Carrere & Denegre, L.L.P.

(57) ABSTRACT

An intermediate scaffold member join comprising a top side, a first side and a second side cooperating to form a channel therebetween. The channel is sized to accept a horizontal scaffold member. The first side has a clamp for attaching to a horizontal scaffold member, the clamp joining a horizontal scaffold member substantially perpendicular to a horizontal scaffold member positioned in the channel. Positioned on the top side is a vertical stub directed away from the channel, where the vertical stub is connectable to a vertical scaffold member.

3 Claims, 3 Drawing Sheets

INTERMEDIATE SCAFFOLD MEMBER JOIN

FIELD OF INVENTION

This invention relates to scaffold structures and, in particular, to placement of an intermediate vertical scaffold member or an intermediate horizontal member.

BACKGROUND OF THE INVENTION

Scaffold frames are structures composed of vertical and horizontal members joined together to create a frame, which usually has an elevated working surface or decking. Large vertical structures are created by joining vertical members together to create a vertical supports that are longer than individual vertical members. Generally, each vertical support for a scaffold frame is a series of joined vertical members that extend in an unbroken string until a foot section is reached, generally positioned on the ground. However, there are instances where a it is desirable to have a vertical member present at a particular elevation without the necessity of connecting that vertical member into a vertical support that extends to the ground level (an "intermediate vertical member"). For instance, an access safety railing located at the working surface may need intermediate vertical members to properly defined the railing. Installing intermediate vertical members has presented stability problems in the intermediate vertical member, particularly rotational instabilities. One device built to overcome some of these concerns is shown in FIG. 1, an intermediate vertical scaffold join. However, this intermediate vertical scaffold join is only useful in scaffold systems using particular latch members—latch members that are designed to latch into cups on a vertical member. A more general intermediated vertical scaffold join is needed.

Additionally, scaffold systems may need an intermediate horizontal member. In general, horizontal scaffold members are joined to vertical scaffold members to create a scaffold frame. There may be instances where it is desirable to join a horizontal member to another horizontal member, an intermediate horizontal member.

OBJECTS OF THE INVENTION

It is an object of the invention to provide a scaffold member join that allows for an easy connection for an intermediate horizontal scaffold member.

It is an object of the invention to provide a scaffold member join which allows for an easy connection for an intermediate vertical scaffold member.

SUMMARY OF THE INVENTION

The invention is an intermediate scaffold member join. The join is formed from a channel which, in placement, opens downwardly. The channel is shaped to engage a horizontal scaffold member within the channel, such as a "U" shaped channel. The interior facing edge of the channel has a clamp positioned for clamping to a second horizontal scaffold member. The exterior facing edge of the channel may have a cutout shaped to accommodate the placement of a horizontal member through the cut out. Positioned on the upper facing edge of the channel is a vertical stub, to which a vertical scaffold member may be inserted over.

DETAILED DESCRIPTION OF THE INVENTION

Figure 1:
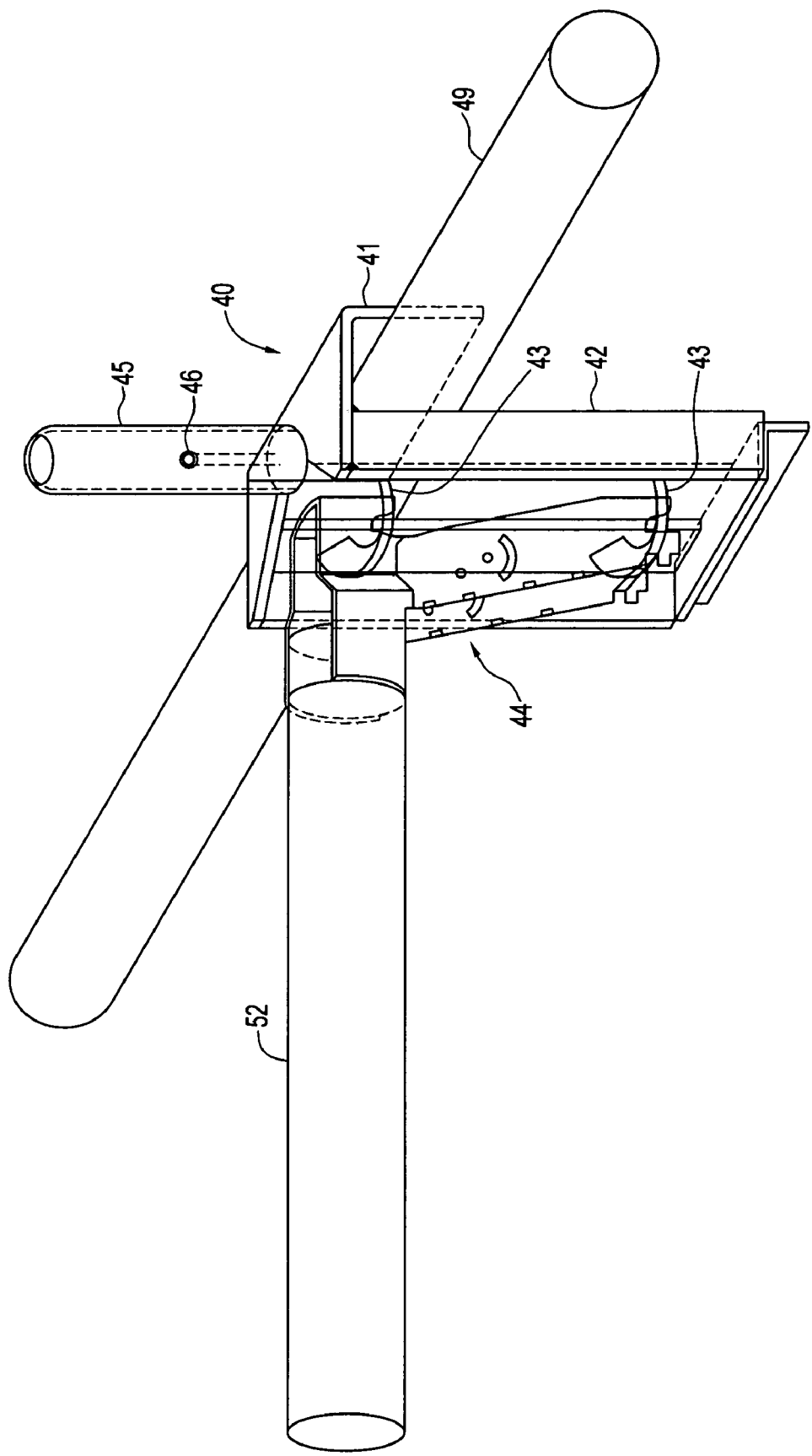
FIG. 1 depicts a prior art scaffold member join.
Figure 2A:
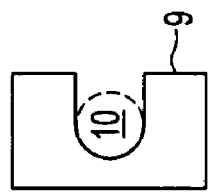
FIG. 2A is an alternate embodiment of the second side of the scaffold member join.
Figure 2:
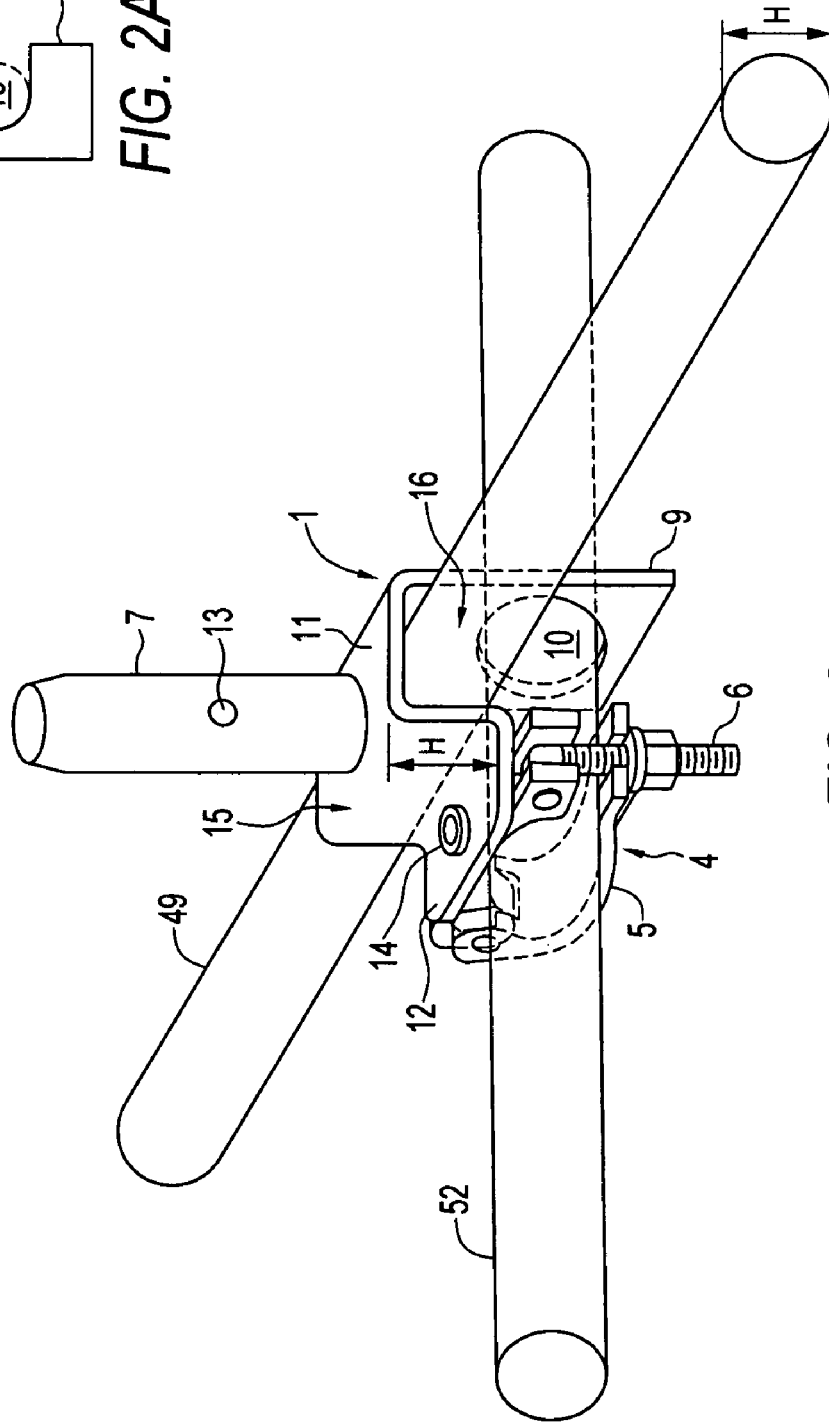
FIG. 2 is a prospective view of the scaffold member join.

Shown in FIGS. 1 and 2 is a prior art intermediate scaffold member join 40. This join is designed to work in scaffold systems where the horizontal scaffold members terminate in latches which are designed to latch into protruding cups positioned on a vertical scaffold member, as disclosed in U.S. Pat. Nos. 5,078,532 and 5,028,164 (the "Williams Joint"). The join 40 is a three sided channel structure, having a top side 37, an interior side 38 and an exterior side 39. Interior side is used to reference the side of the join facing the interior of a box scaffold structure when the join is installed on the structure, while exterior side is used to refer to the side of the join facing the exterior side of the scaffold structure. The interior side, top side and exterior side form a channel 35. The channel is sized to snuggly engage a horizontal scaffold member 49 within the channel. The interior side 38 has two protruding ½ cup members 43, adapted to engage the latch member of the Williams Joint. Located on the top side 37 of the join is an upstanding vertical stub 45. Vertical stub 45 is sized to be insertable into a vertical scaffold member (not shown).

In use, the join's channel 35 is placed over horizontal scaffold member 49, and a second horizontal scaffold member 52 terminating in a latch mechanism 44 is latched onto the two protruding ½ cup members 43 where the two horizontal members 49 and 52 are arranged in a right angle relationship. The latching of the join to horizontal scaffold member 52 helps prevent the rotational instabilities of the vertical stub/vertical member inserted over the stub.

Figure 3:
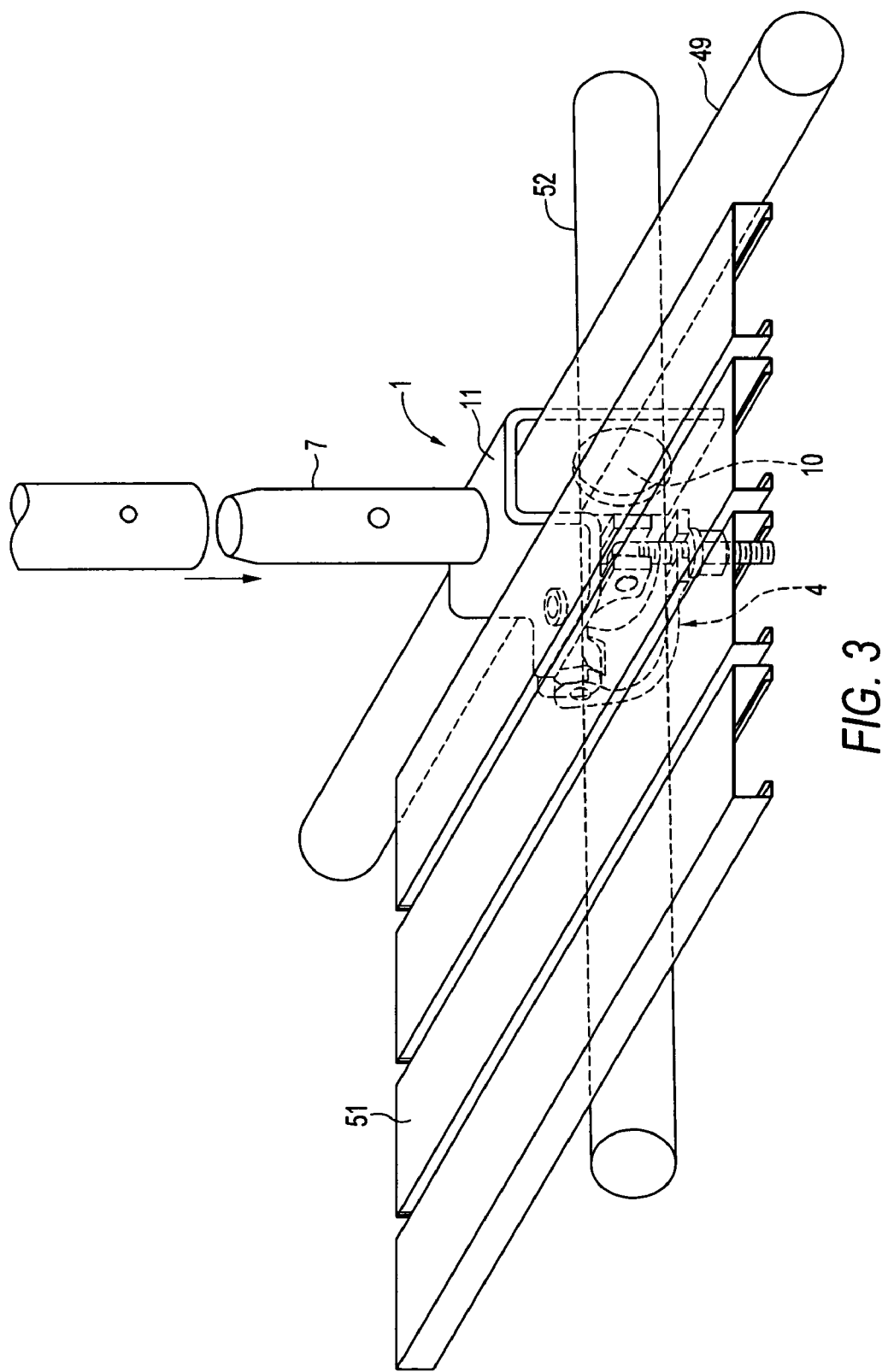
FIG. 3 shows a prospective view of the join installed in a scaffold frame.

A more general type of intermediate scaffold join is shown in FIG. 2. A three sided structure is shown, with a top side 11, a first side 9, and a second side 15 creating a channel 16 therebetween. As shown, first side has a length "H" as shown in FIG. 2. This length "H" determines the depth of the three sided channel 16. As shown, "H" is the cross-sectional length of a horizontal scaffold member which, in FIG. 2, corresponds to the diameter of a horizontal scaffold member when the horizontal scaffold member is a tube member. This channel depth allows the channel to accommodate a horizontal scaffold member (shown as 49 in FIG. 2) within the channel. Additionally, scaffold decking is usually "thinner" than the cross-sectional dimension of the horizontal scaffold members; hence, the offset dimension "H" allows scaffold decking to be placed over the protruding lip without interference, as is shown in FIG. 3. The length of first side could be less than the cross sectional length of a horizontal scaffold member, but in this case, adjustments must be made in the positioning of the attachment means next described.

First side 15 has a protruding lip 12 which projects away from the channel 16. Positioned on this protruding lip 12 is an attachment means for attaching a horizontal scaffold member to the intermediate member join 1. As shown, attachment means is a clamp 4 pivotally attached to protruding lip 12 at pivot 14. The pivot action enables the clamp to adjust to angles of attachment (with respect to the channel) of other than 90 degrees. The second side 9 of the join may have an opening 10 of corresponding shape to the cross section of a horizontal scaffold member. Hence, a horizontal scaffold member 52 may be clamped to the join 1, and the opening 10 on the second side 9 allows for the clamped horizontal scaffold member 52 to be of greater length than necessary, providing for flexibility. Alternatively, the second side 9 could be shortened to be of length "H" thereby dispensing with the need to have an opening 10 in the second side 9. As shown, the join allows for two horizontal scaffold members 52 and 49 to be positioned at the join in a substantially right angle relationship with one member crossing under or over the other member. This arrangement helps the join resist rotation about either horizontal scaffold member 52 or 49. Obviously, the join in FIG. 3 could be employed with the first side 5 facing the interior or the exterior of a scaffold frame.

Instead of a clamp, the first side 15 could be constructed similarly to that shown for the second side 9, that is, the first side 15 and second side could be substantially identical—a downwardly projecting plate with an opening therein to accommodate a horizontal scaffold member (the opening could be completely enclosed as shown in FIG. 2, or the opening could be partially enclosed, as shown in FIG. 2A). This opening forms the attachment means for a horizontal scaffold member. While such a design resists rotation about the two axis that align with the horizontal scaffold members, this embodiment does not resist translational movement or the sliding of horizontal member 52 along its length, and hence, is not preferred. Positioned on the top side 11 of the join 1 is an upstanding vertical stub 7. Vertical stub 7 is sized to allow a vertical scaffold member to slide over the stub to thereby create an intermediate vertical horizontal scaffold member which is rotationally stable (obviously, the stub could be sized to allow a vertical scaffold member to be inserted into the stub). As shown, a vertical stub is welded to the top side, but could also be detachable, such as by having a sleeve on the top side with a tab located on the vertical stub which inserts into the tab. Vertical stub 7 may have a latch button 13 which aligns and protrudes through a corresponding opening in a vertical scaffold member inserted over the vertical stub. The depressable latch button is used to lock the vertical scaffold member to the vertical stub.

As described, the join can be used to place an intermediate horizontal member in place on a scaffold frame without utilizing the vertical stub for inclusion of a vertical member, or an intermediate vertical scaffold member on a scaffold frame.

Although the present invention has been described in terms of specific embodiments, it is anticipated that alterations and modifications thereof will no doubt become apparent to those skilled in the art which are intended to be included within the scope of the following claims.

We claim:

1. An intermediate vertical member join comprising a top side, a first side and a second side cooperating to form a channel therebetween, said channel sized to accept a horizontal scaffold member in said channel, said first side having an attachment means for attaching to a horizontal scaffold member, said attachment means adapted to join a horizontal scaffold member at an angle to a horizontal scaffold member positioned in said channel; and a vertical stub positioned on said top side directed away from said channel, said vertical stub adapted to connect to a vertical scaffold member.

2. The intermediate vertical scaffold join of claim 1 wherein said attachment means is a clamp.

3. The intermediate vertical scaffold join of claim 1 wherein said second side further has an opening therein adapted to accommodate a horizontal scaffold member, said opening aligned to accept a horizontal scaffold member positioned in said attachment means.

* * * * *